April 30, 1957 J. W. WILLIAMSON 2,790,883

HIGH-FREQUENCY INDUCTOR BLOCK

Filed July 16, 1953

INVENTOR.
JAMES W. WILLIAMSON
BY
Alfred C. Body
ATTORNEY 2,790,883
Patented Apr. 30, 1957

2,790,883

HIGH-FREQUENCY INDUCTOR BLOCK

James W. Williamson, Warrensville Heights, Ohio, assignor to The Ohio Crankshaft Company, Cleveland, Ohio, a corporation of Ohio Application July 16, 1953, Serial No. 368,442
1 Claim. (Cl. 219—10.79)

This invention relates to inductors for high-frequency induction heating and, more particularly, to an inductor and a method for varying the input impedance of the inductor on the power source and controlling the loading of the inductor when coupled with its workpiece on the power source.

In the field of high-frequency induction heating, it is conventional to employ an inductor formed from a slab of high-conductivity material, such as copper, having a workpiece-receiving bore or opening extending from one side to the other. A slot extends from the bore to the edge of the slab, providing on each side of it a pair of parallel, close-spaced, "fish-tail" leads which are connected to a suitable source of high-frequency electric power. Such sources may consist of rotary-type, high-frequency generators or electronic-type power sources.

Alternatively, the inductor may comprise a length of a conductive material shaped into a loop to form the workpiece-receiving opening and with the ends extending away from the loop in close-spaced parallel relationship.

High-frequency electric currents from the power source, whichever type may be employed, circulate down the leads of the inductor and around the workpiece opening, inducing concentrated, high-frequency currents to flow peripherally around the portion of the workpiece within the opening, which currents heat the portion very rapidly to a desired elevated temperature.

The axial width of the workpiece in which the concentrated currents flow is primarily a function of the ratio of the workpiece-opening diameter to the workpiece diameter and the thickness of the inductor or, in other words, the axial length of the workpiece opening.

As the ratio of the workpiece-opening diameter and workpiece is increased, the width of the pattern on the workpiece is increased and vice versa. If the length of the workpiece opening is increased, the width of the heat pattern on the workpiece also increases and vice versa.

These same factors also have a direct effect on the input impedance of the inductor and of the loading of the inductor with the workpiece in position on the power source.

If the ratio of the workpiece-opening diameter to the workpiece diameter is increased, the loading decreases and vice versa. If the thickness of the block or the length of the workpiece opening is increased, the input impedance goes down and the loading of the inductor on the power source increases and vice versa.

Oftentimes, the ratio of the workpiece-opening diameter to the workpiece diameter and the axial length of the workpiece opening are predetermined for one reason or another such as the necessary or required width of heat pattern. Other times, the inductor block is constructed in accordance with a predetermined design and it is later found that the input impedance of the inductor is too low so that the power source is overloaded.

Inductors of this type are normally always connected to their power source through an impedance-matching device or transformer and, in some cases, the effects of this overloading or low input impedance of the inductor can be corrected by changing or increasing the impedance ratio of the matching transformer. However, at times, changing the impedance ratio of the transformer is not feasible. In some cases, where a fixed ratio transformer is already installed, a new transformer with a different ratio is required, thus obsoleting the old transformer. In other cases, it is not feasible or electrically efficient to obtain a greater ratio of impedance transformation. This is particularly true with electronic-type power sources which have an internal impedance on the order of a thousand ohms or more. Matching such a power source to the extremely low impedance of a properly loaded inductor is exceedingly difficult and sometimes cannot be done even though a single-turn secondary transformer is employed.

Another difficulty has been where a pair of inductors are employed which are to be electrically connected either in parallel or in series with the same power source. Here, the inductors, even though of identical dimensions, may have different input impedances and will not draw the same amount of power from the power source.

It has previously been proposed in the patent to Wadhams, No. 2,528,714, dated November 7, 1950, assigned to the assignee of this application, to provide an enlargement in the width of the slot between the close-spaced fish-tail leads, which enlargement was void of electrically conducting material to increase the input impedance of the inductor. By progressively enlarging this opening, such as by using machining operations, it was possible to adjust the loading of the inductor on the power source. However, if the opening were at any time made too large, it was an extremely difficult problem to make the opening smaller so as to compensate for any errors made.

This same patent also showed the use of an auxiliary opening in the inductor block on the side of the workpiece-receiving opening remote from the fish-tail leads, the area of which could be varied by means of a sliding contact plug so that the loading of the inductor on the power source could be adjusted. Such sliding contacts are not generally satisfactory. Dirt between the surfaces prevents good, electrical contact and if the adjustment is made during the time when power is flowing in the inductor, serious sparking occurs.

It has further been proposed to provide inductor blocks with various electrical switching arrangements, but such arrangements were always expensive, difficult to maintain and the problem of keeping the electrical contact surfaces clean was always present.

The present invention contemplates a construction and method of individually enabling adjustment of the input impedance of a high-frequency inductor whereby all of the above referred to difficulties will be alleviated and the input impedance of the inductor can be varied without any electrical contacts being made or broken.

In accordance with the invention, an opening is provided around which the currents to the inductor flow in combination with an electrically conductive plug of a shape correspondingly shaped to the opening and adjustably supported therein. By moving the plug into and out of the opening, the impedance to the flow of currents may be adjusted.

In preferred embodiments of the invention, an inductor is provided having a workpiece-receiving opening and a pair of parallel, close-spaced, fish-tail leads which are adapted to connect to a power source so that high-frequency currents may be flowed around the workpiece-receiving opening. The inductor is provided with an auxiliary opening around which the electric current must flow in series with the workpiece-receiving opening in combination with an electrically conductive member adjustably positioned in this opening but electrically insulated from the surfaces thereof by which the input impedance of the inductor may be varied. Thus, it might be said that the inductor has an auxiliary opening in electrical series with the workpiece-receiving opening for the purpose of increasing the input impedance of the inductor in combination with an electrically conductive plug adjustably positioned in the opening for the purpose of lowering the input impedance to a desired value. This member is preferably water cooled to remove the heating resulting from currents induced in the member.

This adjustable member is desirably constructed of a material of low electrical resistance such as silver, copper or aluminum, copper being preferred because of its relatively low cost and high conductivity. By using low-resistant material, the power absorbed in the member can be held to a minimum. Even so, water cooling of the member is considered desirable.

Further, in accordance with the invention, the member and the auxiliary opening in the inductor are so formed and constructed that the current flowing on the surfaces of the opening and induced to flow on the surfaces of the member will be relatively uniformly distributed over the opposing surfaces, regardless of the adjusted position of the member in the opening. Thus, preferred embodiments of the invention contemplate making the opening and the member conical in shape so that for any adjusted position of the member, the spacing between the opposed surfaces can be generally uniform over the entire length of the opening, at least over a maximum range of adjustment of the member.

The principal object of the present invention is the provision of a new and improved high-frequency inductor arrangement having readily adjustable means not involving electrical contacts for controlling the power input to a high-frequency inductor.

Another object of the invention is the provision of a high-frequency inductor having a workpiece-receiving opening and an auxiliary opening in electrical series therewith in combination with an electrically conductive member adjustably supported in the auxiliary opening for the purpose of controlling the input impedance of the inductor.

Still a further object of the invention is the provision of a high-frequency inductor having an auxiliary power input controlling opening and an electrically conductive member adjustably positioned in this opening, the opening and member having coacting shapes such that the currents flowing in the surface of the opening and induced from the surface of the member will be generally uniformly distributed over the surfaces for a maximum range of adjustment of the member.

Another object of the invention is the provision of a new and improved high-frequency inductor having simple means for controlling the input impedance of the inductor.

Another object is the provision of means for adjusting the impedance of a high-frequency electric power circuit comprising electrically conductive member or members in electrical series with electric power flow and defining a conical shaped opening in combination with an electrically conductive conically shaped member adjustably positioned in the opening.

The invention will be specifically set forth and defined in the appended claim. The invention, of course, may take physical form in a number of different-appearing embodiments and preferred embodiments of the invention will be described in detail in this specification and illustrated somewhat diagrammatically in the accompanying drawings which form a part of this specification, and wherein:

Figures 1, 2:
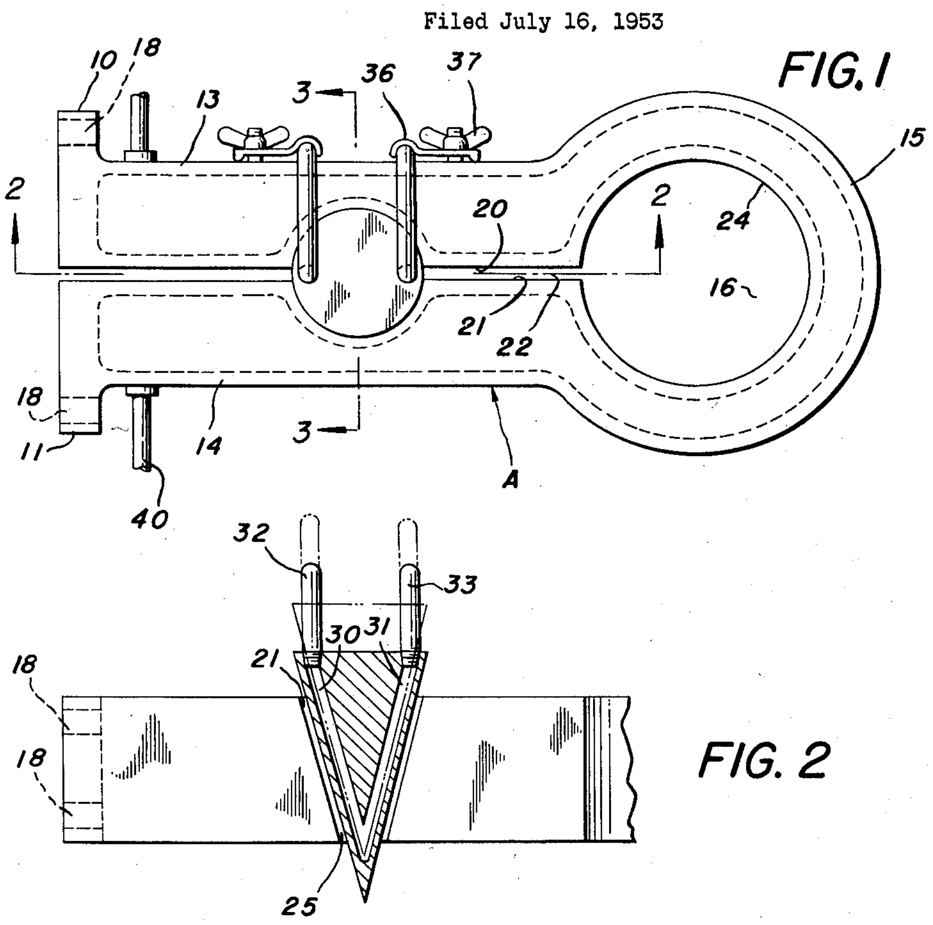
Figure 1 is a top elevational view of a high-frequency inductor arrangement embodying the present invention.
Figure 2 is a side sectional view of Figure 1 taken approximately on the line 2—2 thereof.

Referring now to the drawings wherein the showings are for the purposes of illustrating the invention only and not for the purposes of limiting same, the figures show a high-frequency inductor block A comprised of a pair of terminal blocks 10, 11 adapted to be fastened to the terminals of a suitable impedance-matching transformer, a pair of fish-tail leads 13, 14 and an arcuate conductor 15 defining a workpiece-receiving opening 16, the members just referred to forming one continuous electrically conductive turn or loop from one terminal block to the other.

As stated, these terminal blocks are adapted to be fastened to the terminals of an impedance-matching transformer and are provided with transverse openings 18 through which bolts, not shown, are adapted to extend into the terminal blocks of the impedance-matching device, also not shown, for the purpose of supporting the inductor in position and electrically energizing same.

The fish-tail leads 13, 14 are generally rectangular in cross section having opposed surfaces 20, 21 respectively which are in close-spaced opposed relationship and define between them a slot 22. This slot 22 provides the electrical insulation between the two fish-tail leads. If desired, electrically insulating material may be placed therein but, generally, this is not necessary. The conductor 15 is also generally rectangular in cross section, although it may be otherwise, and has a workpiece-facing surface 24 which defines the workpiece-receiving opening 16. The shape of the workpiece-receiving opening may be as desired to correspond to the shape of the workpiece to be heated therein, it being appreciated that when a metallic workpiece is positioned in this opening and high-frequency electric currents flowed in the inductor, the magnetic lines of force due to the currents flowing in the conductor 15 will link with the workpiece and induce similar high-frequency currents to flow in the workpiece. It is these high-frequency currents which rapidly heat the workpiece to an elevated temperature. Also, the length of the workpiece-receiving opening 16, which is primarily determined by the height of the conductor 15, may be as desired but determined principally by the width of the heat pattern desired on the workpiece.

The diameter of the workpiece-receiving opening 16 may also be as desired but is generally proportioned as is well known in the art to provide a desired degree of coupling with the workpiece, it being appreciated that the closer the two diameters; that is, the smaller the clearance between the surface of the workpiece and the surface 24, the greater the loading on the power source will be for any given diameter of workpiece. Also, the lesser the clearance, the more sharply defined will be the edges of the heat pattern. The specific design of the workpiece-receiving opening forms no part of the present invention, except that by virtue of the present invention, the designer may relatively arbitrarily selected a diameter of opening 16 relative to the workpiece such that he knows that, normally, such a design would overload his power source. In fact, the dimensions of the workpiece-receiving opening 16 should be so selected that, in the absence of the present invention, the inductor would overload the power source.

Thus, the present invention primarily provides a means for lowering the loading of an inductor on its power source, although the invention may be employed for either lowering or increasing the loading from the original designed loading.

Thus, in accordance with the invention, the slot 22 has an enlargement 25 midway between its ends; that is, between the terminal blocks 10 and the conductor 15, which opening 25 is defined by concave surfaces or recesses 20', 21' respectively formed on the surfaces 20, 21 of the fish-tail leads 13, 14. Each of these surfaces, as can be seen from the figures, is in the shape of a frustum of a cone and as the surfaces are disposed directly opposite to each other, they define generally an opening in the shape of the frustum of a cone. The provision of such an opening as described in the above referred to patent will serve to substantially increase the input impedance of the inductor above that which would be the case if this opening 25 were not present. A plug member 26 generally in the shape of a cone and having an upper surface 27 and a pointed tip 28 and conical side surfaces 29 is adjustably supported in the opening 25 with the surfaces 29 always in electrically insulated relationship from the surfaces 21', 20'. As shown, the plug 26 has a pair of passages 30, 31 extending downwardly through the upper surface 27 and intersecting interiorly of the plug 26 adjacent the tip 28. Plumbing connections 32, 33 communicate respectively with the openings 30, 31 and a source of a cooling means such as water not shown so that the plug 26 can be continuously cooled during operation.

The invention contemplates means for adjustably supporting the plug 26 in the opening 25, which, in the embodiment shown, is effected by so arranging the plumbing connections 32, 33 that they serve as a physical support for the plug 26. Thus, the plumbing connections 32, 33 have a reversely bent portion 35 which extends along the outer side of the fish-tail lead 13 and is so spaced from the plug 26 that the plug will be centrally located in the opening 25. Clamping means shown as a bracket 36 and a wing nut 37 are provided for rigidly fastening the portion 35 to the side of the fish-tail lead 13. It will thus be appreciated that by adjusting the position of the portion 35, the plug 26 may be placed in any desired elevation in the opening 25 and then held in this position by tightening on the wing nut 37.

Figure 3:
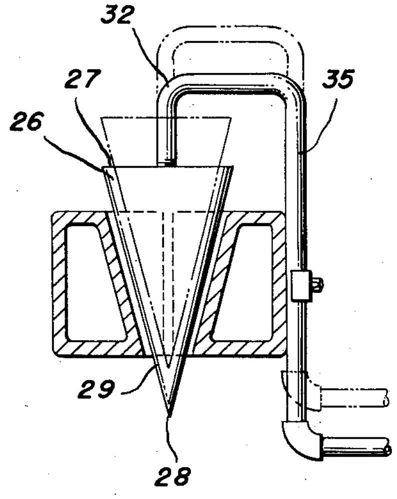
Figure 3 is a cross-sectional view of Figure 1 taken approximately on the line 3—3 thereof.

Figures 2 and 3 show the plug 26 in two adjusted positions.

It will be appreciated that in some instances where the duty cycle is not severe, the plumbing connections can be dispensed with and the plug 26 cooled by direct radiation to the surrounding air. In such event, other means could be provided for adjustably supporting the plug 26 in operative position in the opening 25. Alternatively, the plumbing connections could be employed and other means employed for adjustably positioning the plug 26.

It will be noted that the fish-tail leads 13, 14 and the conductor 15 are hollow throughout their length and plumbing connections 40, 41 are provided by which cooling water can also be circulated to the inductor A.

High-frequency electric currents will, at any one instance, for example, flow from the terminal block, down the fish-tail lead, around the conductor 15, back the opposite fish-tail lead 14 to the other terminal block 11. Because of the peculiar characteristics of high-frequency current, all of this current flow will be generally concentrated on the surfaces 20, 20', 24, and 21', the currents being attracted to these surfaces because of the proximity of oppositely flowing currents in immediately adjacent surfaces which, in the case of the surface 24, would be in the workpiece in the opening 16 and, in the case of the surfaces 20', 21', would be in the plug 26. As is known, the currents flowing in these surfaces generate oppositely flowing currents in any metallic surface adjacent thereto.

With the conical shape of the plug 26 and the opening 25, there will be generally a uniform distribution of the current over the entire width of the opening 25 and over the entire width of the surface 29 of the plug 26 which is directly opposite to the surfaces 20', 21'. The effect of the opening 25 in the absence of the plug 26 is to present a substantial inductance in the electrical circuit to thus increase the input impedance of the inductor. The effect of the plug 26 when fully inserted into the opening 25 as shown in full lines in Figures 2 and 3 is to, in effect, cancel this increased inductance and the currents will flow as though the openings 25 were not present. With the plug 26 removed partway as shown by the dotted lines of Figures 2 and 3, a situation will exist partway between the two extremes. By thus adjusting the plug, any desired input impedance for the inductor may be obtained within the maximum and miminum limits.

The preferred embodiment of the invention contemplates the use of the conical plug 26 and the conical opening 25. The invention does not rule out, however, the use of a cylindrical plug and cylindrical opening. However, generally such shapes will not be as satisfactory as the conical shape. It will be appreciated that with a cylindrical plug, the clearances between the walls of the plug and the walls of the opening will remain the same over the entire range of adjustment of the plug, at least while some portion of it is positioned within the opening. If it be assumed that the plug is removed half way from the opening, then all of the currents induced to flow in the plug will be in a portion of the plug equal to one-half the length of the opening. Such concentrations of current are considered undesirable and will cause localized heating of the plug.

With the shape shown, however, it will be appreciated that within the limits of adjustment shown in Figures 2 and 3, the plug will, at all times, extend across the full length of the opening 25, the variations in impedance being obtained by a variation in the spacing of the walls 29 of the plug 26 from the surfaces 20', 21'. A uniform current distribution over the entire length of the plug within the opening will thus exist.

In the embodiment of the invention shown, the plumbing connections 32, 33 in effect electrically connect the plug 26 to one of the fish-tail leads 13, but this is not detrimental to the over-all operation of the device and will not affect the impedance controlling function of the invention. Obviously, the plumbing connections 32, 33 could be of electrical insulating material or if an electrically conductive material, could be electrically insulated from the fish-tail lead 13.

It will thus be seen that a preferred embodiment of the invention has been described which accomplishes all the objects of the invention heretofore set forth and others and provides a simple readily adjustable means not involving any electrical contacts for the purpose of controlling the input impedance and, thus, the power input to a high-frequency inductor.

It will be appreciated, that if desired, the opening 25 could be provided on the far side of the workpiece opening 16 from the terminal blocks 10, 11, it being immaterial as to the exact location of the opening 25, so long as its surfaces are in electrical series relationship with the surfaces of the workpiece-receiving opening.

It would be appreciated that the invention may take physical form in other manners. For example, the conically shaped opening could be formed by means of a multi-turn conically shaped spiral winding, which winding if placed in series with a high-frequency inductor or inductor coil, would offer a high impedance to the flow of currents therethrough. A plug conically shaped to correspond to the internal shape of the coil could then be adjustably positioned in this coil to control the impedance of this coil to the flow of electric current therethrough. The operation will be generally identical to that described with reference to the preferred embodiment above; that is to say, the plug would have the currents which are induced therein evenly spread over its entire surface.

The invention may be generally defined as means for adjusting the impedance on an electric circuit including a high-frequency inductor comprising an electrically conductive member or members in electrical series with the power flow and defining a conically shaped opening in combination with an electrically conductive conically shaped member adjustably positioned in the opening.

Throughout the specification, the workpiece-receiving opening has generally been shown as consisting of a single turn of electrically conductive material. Obviously, the workpiece-receiving opening could have any number of turns defining it. In the preferred embodiment described above, there is, in effect, a series impedance adjusting opening of one turn in combination with a workpiece-receiving opening of one turn. Such a one-turn impedance adjusting opening has been found to give a sufficiently wide range of adjustment with the one-turn workpiece-receiving opening. Obviously, if a workpiece-receiving opening is to be defined by more than one turn, then, generally, the impedance adjusting opening should have an additional number of turns if the same relative range of impedance adjustment is to be obtained.

It will be appreciated that with the present invention, a plurality of inductors, all in electrical parallel relationship, can be connected to a common high-frequency power source and the power absorbed by each inductor relative to the other inductors readily adjusted.

A preferred embodiment of the invention has been described in considerable detail. Obviously, modifications and alterations will occur to others upon a reading and understanding of this specification and it is my intention to include all such modifications and alterations insofar as they come within the scope of the appended claim.

Having thus described my invention, I claim:

In a high frequency inductor comprised of a split inductor loop adapted to have a work piece inserted therein, a pair of fish-tail leads, leading from both ends of said loop and adapted to be connected to a source of high frequency power and thus to have electrical currents flowing therein, said leads having generally partially shaped conical opposed surfaces cooperatively defining an impedance controlling loop with a part of said loop being in each lead, said leads having generally close-spaced parallel opposed surfaces on opposite sides of said loop, and an electrically conductive plug adjustably positioned in said impedance controlling loop, and between said partially conical opposed surfaces of said leads the improvement which comprises providing the impedance controlling loop and the electrically conductive plug with a conical longitudinal cross-sectional shape such that as the plug is adjusted into and out of said opening the power to the work piece in the inductor loop will respectively increase or decrease and the surfaces of said plug directly within the opening will all be at a uniform distance from the surfaces of said opening and the electrical currents induced to flow in said plug will be uniform over the entire surface of the plug within the opening.

References Cited in the file of this patent

UNITED STATES PATENTS

| | | |
|---|---|---|
| 1,861,869 | Long | June 7, 1932 |
| 2,005,203 | Polydoroff | June 18, 1935 |
| 2,453,529 | Mittelmann | Nov. 9, 1948 |
| 2,493,388 | Candy | Jan. 3, 1950 |
| 2,528,714 | Wadhams | Nov. 7, 1950 |
| 2,647,200 | Redmonds | July 28, 1953 |
| 2,655,590 | Gardner | Oct. 13, 1953 |
| 2,664,795 | Tone | Jan. 5, 1954 |

FOREIGN PATENTS

| | | |
|---|---|---|
| 667,839 | Great Britain | Mar. 5, 1952 |